UNITED STATES PATENT OFFICE.

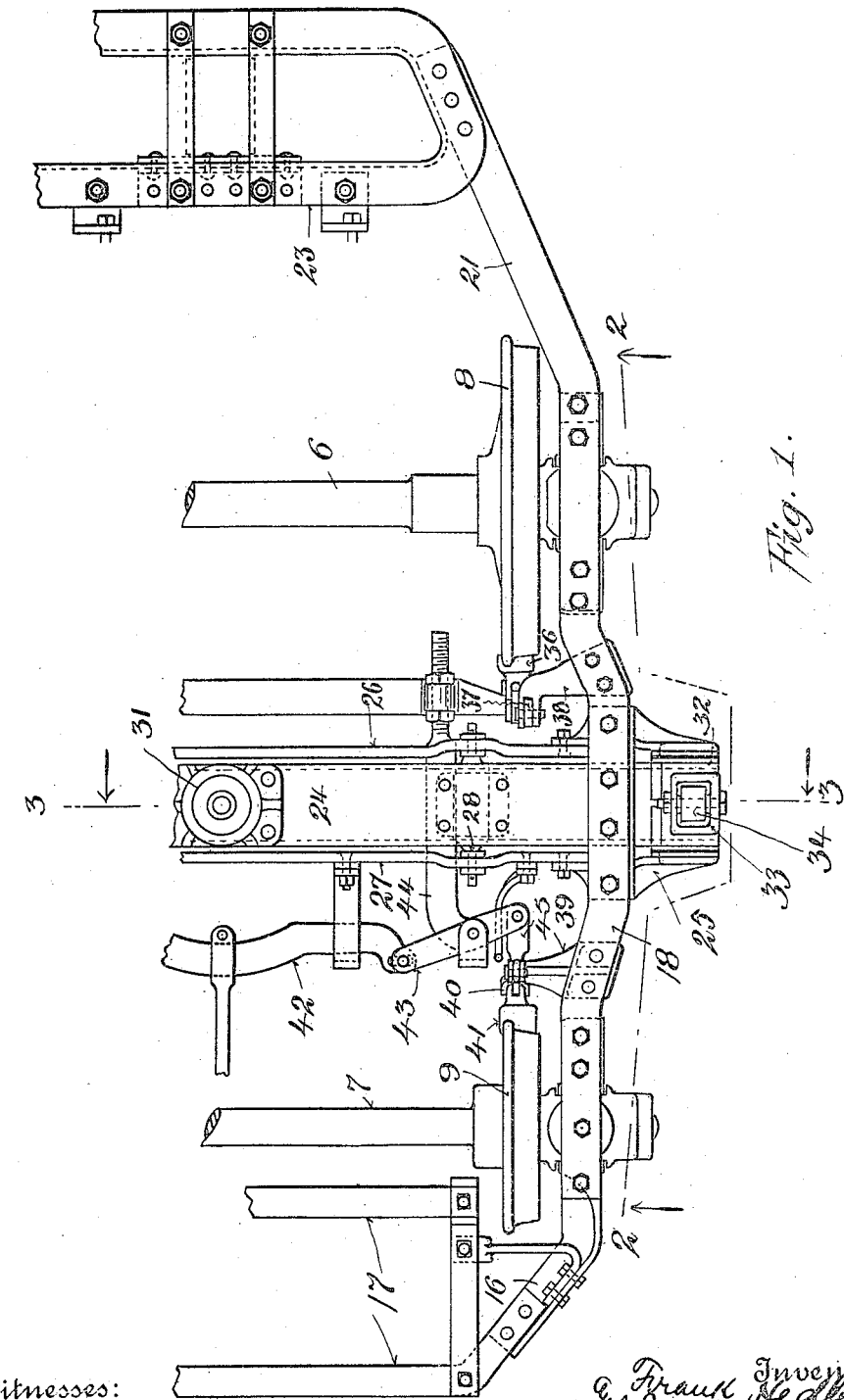

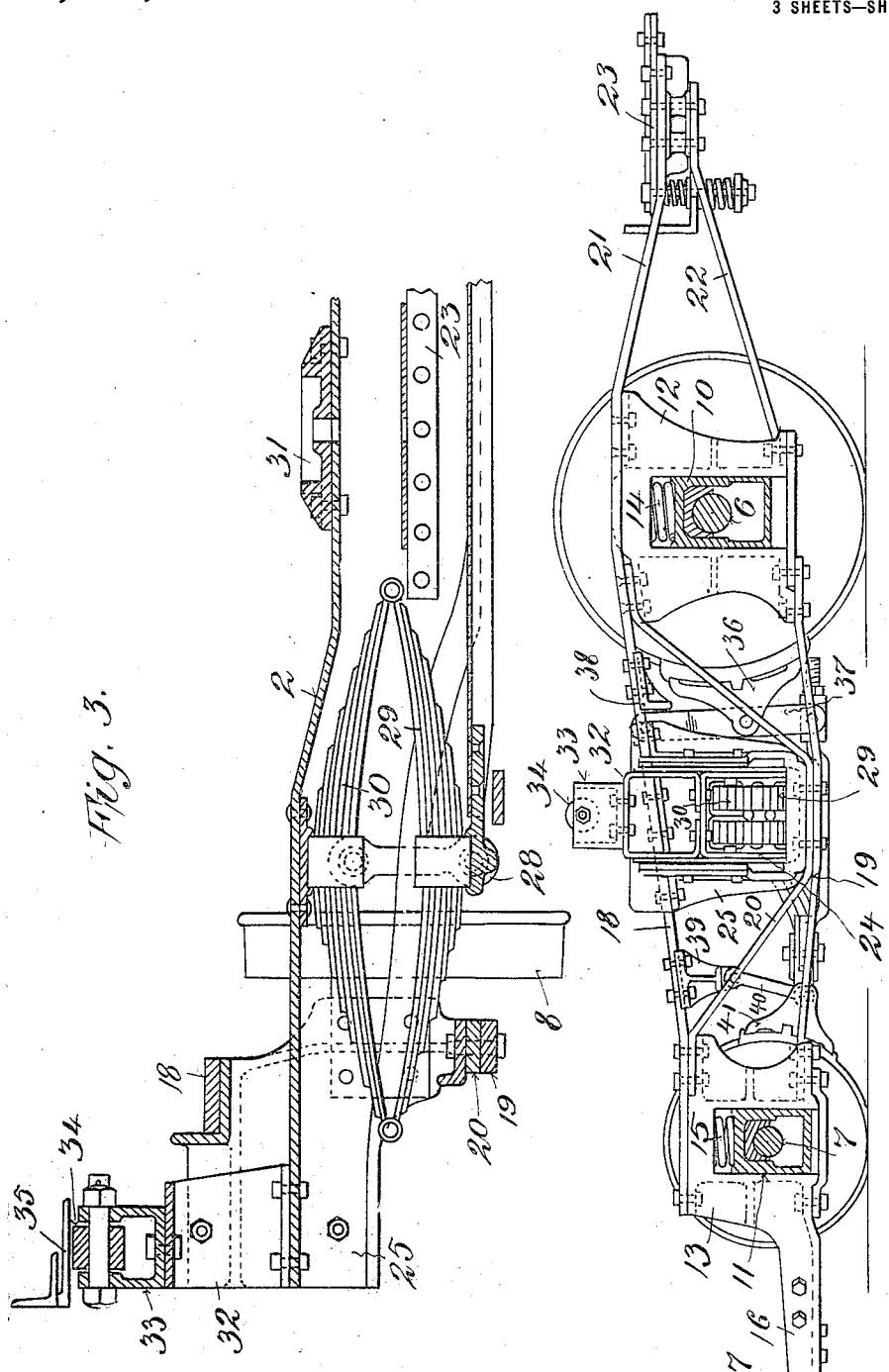

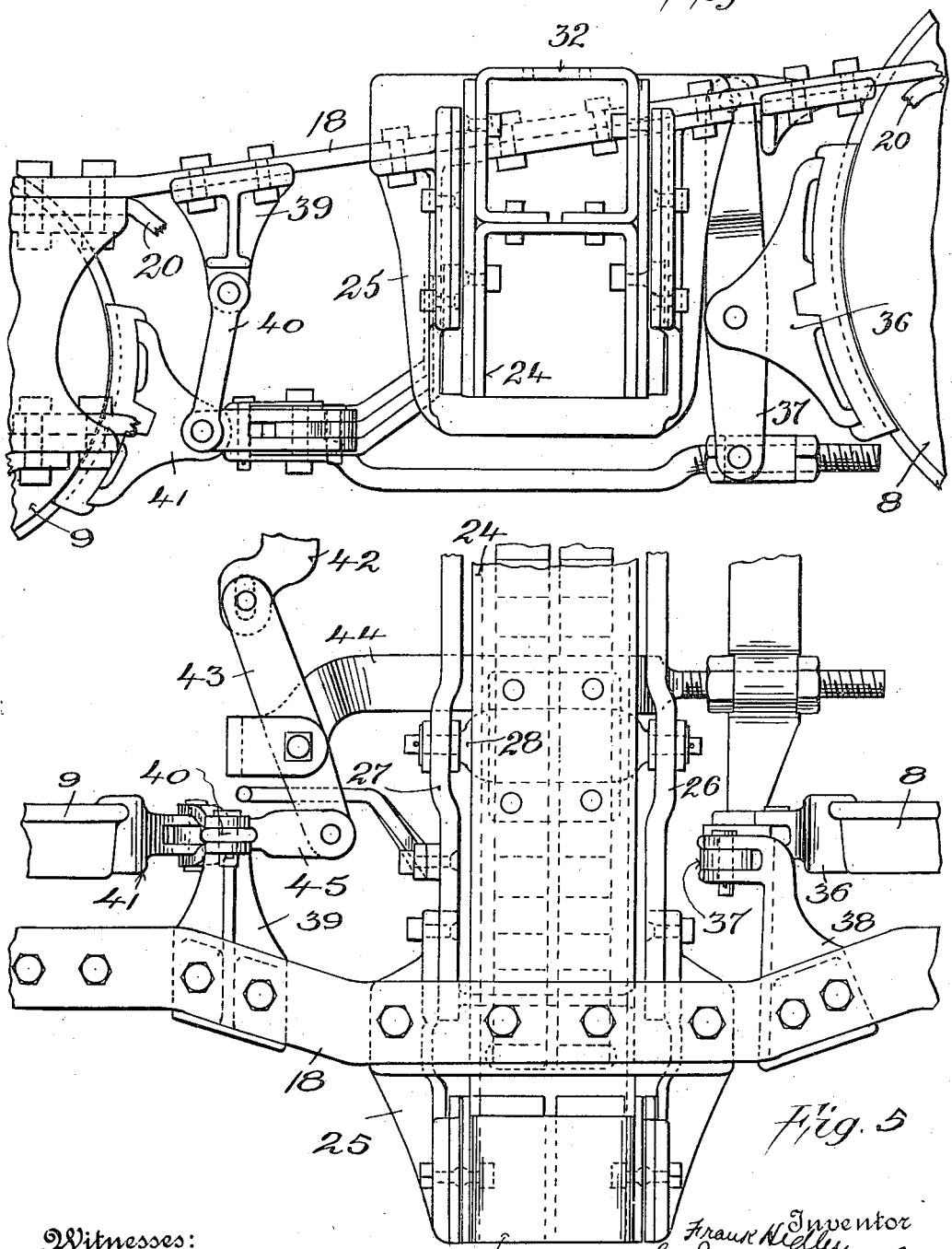

FRANK HEDLEY, OF YONKERS, AND JAMES S. DOYLE, OF MOUNT VERNON, NEW YORK.

CAR-TRUCK.

1,252,434. Specification of Letters Patent. Patented Jan. 8, 1918.

Application filed May 5, 1913. Serial No. 765,456.

*To all whom it may concern:*

Be it known that we, FRANK HEDLEY and JAMES S. DOYLE, both citizens of the United States, and residing, respectively, at Yonkers and Mount Vernon, in the county of Westchester, State of New York, have made a certain new and useful Invention in Car-Trucks, of which the following is a specification.

This invention relates to car trucks.

The object of the invention is to provide a construction of truck which is simple and efficient, and wherein the truck bolster is brought to a minimum height above the level of the track rails and of the surface of the ground or pavement, thereby permitting the floor level of the car body to be brought to a minimum height.

A further object is to provide a car truck of the nature referred to wherein simple and efficient provision is made for suspending, or supporting, and operating the brake shoes.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the accompanying drawings, and to the various views appearing thereon:

Figure 1 is a view in top plan of a portion of a car truck embodying the principles of our invention.

Fig. 2 is a side elevation of the same parts in vertical section on the line 2, 2, Fig. 1, looking in the direction of the arrows.

Fig. 3 is a view in section on the line 3, 3, Fig. 1, looking in the direction of the arrows.

Figs. 4 and 5 are fragmentary views in side elevation and top plan, respectively, of a portion of the truck bolster and showing the means by which the brake shoes are supported and operated.

The same part is designated by the same reference sign wherever it occurs throughout the several views.

In order to secure greater stability and to prevent undue vibration of street and other car bodies, as well as to increase the ease and comfort of passengers while boarding and alighting from the car and to avoid and reduce to a minimum the danger of accident to passengers while boarding and alighting from the car, it is desirable that the floor level of the car be brought down to a minimum height or distance above the track rails or the surface of the ground or pavement. For instance, it is desirable that the floor level of the car be brought down to a single step distance from the ground. This is the great object sought to be attained in the so-called "stepless car," and by eliminating the use of steps for exit from or gaining access to street or other cars, a very prolific source of accidents and personal injury to the street car traveling public is eliminated. Moreover, experience in the use and operation of "stepless cars" has shown that the closer to the surface of the ground the floor level of the car is brought the less will be the lateral or side vibration of the car while in use, and hence the easier, smoother and more comfortable will be the riding therein. The attainment of these desirable results imposes requirements upon the trucks of the cars, and necessitates a special construction of truck to meet such requirements. It is among the special purposes of our present invention to provide a structure of truck which will meet the requirements and while we have shown a truck of the general "maximum traction" type, it is to be understood that our invention in its broadest scope, as defined in the claims, is not to be limited or restricted to this particular general type.

In the drawings 6, 7, designate the truck axles and 8, 9, the truck wheels. The ends of the axles are received in journaled boxes 10, 11, mounted in the side frames of the truck. Each side frame of the truck (only one of which is shown) includes the castings 12, 13 in vertical openings of which the boxes 10, 11, respectively, are mounted, suitable springs 14, 15 being interposed between the boxes 10, 11, and the end walls of the openings in the castings in such relation as to receive the weight of the truck frame. The casting 13 is provided with an extension 16, to which, and to a corresponding member on the opposite side frame of the truck, are connected the ends of transversely extending braces 17. The two side frame castings 12, 13, are connected together both at top and bottom, by the frame members 18, 19, while a strut or brace 20 is secured at its ends to the upper portions of the castings 12, 13, or to the frame member 18, and, intermediate its ends, to the frame member 19, thus securing a strong well braced side frame structure, and which, at the same time, is light. From the casting 12, extend the braces 21, 22, the former, if desired, being an extension of the frame member 18, and the latter being secured to a convenient flange of the casting 12, at the lower part thereof, as shown. The braces 21, 22, are respectively inclined downwardly and upwardly, and also inwardly from the casting 12, and at their remote ends are secured together and to a transversely extending frame portion 23, which affords a convenient support for a motor (not shown) to drive the truck axle 7.

The truck bolster is in the form of an inverted U-shaped channel member 24, which extends transversely across the truck. The truck side frame is provided with a yoke 25, which is supported by the upper and lower frame members 18, 19. Bolted at their ends to the yoke 25, are transversely extending bars 26, 27, respectively arranged on opposite sides of the bolster 24. Supported between the bars 26, 27, are the cradles 28, the cradle at only one side of the truck being shown. Upon each cradle 28, is supported the two sets of leaf springs 29, 30, said sets of springs being reversely arranged with respect to each other, and arranged inside the channel of the truck bolster, the said bolster channel resting upon the upper set of springs. This affords a construction in which a minimum space is occupied by the springs, the latter, extending longitudinally of the bolster and within the channel thereof, and receiving the weight of the car body. Intermediate its ends the truck bolster 24, is depressed, and the depressed portion thereof carries the seat 31, for the car body king pin. By this arrangement the portion of the truck bolster which receives the car body or car body bolster, is brought to a level below that which is impossible of attainment in trucks of the ordinary construction, thereby enabling us to reduce the height of the car floor level to a minimum distance above the surface of the ground, without sacrificing anything of strength.

The ends of the truck bolster extend beyond the truck side frames and mounted on the extended ends of the bolster are pedestals 32, upon which are carried supports 33, for rollers 34, upon which rollers rest the wear plates 35, of the car body, see Fig. 3.

In order to accommodate and operate the brake shoes, we have shown the shoe 36, for wheel 8, as being pivotally mounted upon a link 37, which is pivotally suspended at upper end from a bracket 38, suitably bolted upon a convenient part of the truck side frame. Similarly a bracket 39, also secured to the truck side frame on the opposite side of the truck bolster, forms a support for a swinging link 40, which carries the brake shoe 41 of wheel 9. The links 37, 40 are coincidently rocked or swung in opposite directions to set or to release the brake shoes in any suitable or convenient manner. In the arrangement shown the brake beam 42, which is operated in the usual manner, rocks a lever 43 which is pivotally connected to the brake shoes supporting links 37, 40, through the connections 44, 45.

A construction of truck such as above described is not only simple, efficient, strong and well braced, but it is also light in weight and affords ample convenience for carrying, and operating the brake shoes, for supporting the propelling motor, and for receiving and supporting the car body, while at the same time enabling the floor level of the car body to be brought down to a minimum height above the surface of the track rails or ground.

Having now set forth the object and nature of our invention, and a construction embodying the principles thereof, what we claim as new and useful and of our own invention, and desire to secure by Letters Patent is:—

1. In a truck, truck wheels of relatively different diameters, side frames supported yieldingly by the axles of said wheels, a bolster depressed intermediate its ends, and independent springs for supporting said bolster.

2. In a truck, truck wheels of relatively different diameters, side frames, yieldingly supported by the axles of said wheels, a transversely extending inverted U-shaped member forming a bolster secured to said side frames, and springs located within the U-shaped bolster for supporting the same.

3. In a truck, truck wheels of relatively different diameters, side frames yieldingly supported by the axles of said wheels, a transversely extending inverted U-shaped member forming a bolster secured to said side frames. said bolster being depressed intermediate its ends, a cradle for each end of said bolster, and an independent spring interposed between said cradle and said bolster.

4. In a truck, truck wheels of relatively different diameters, side frames yieldingly supported by the axles of said wheels, a transversely extending inverted U-shaped member forming a bolster secured to said side frames, said bolster being depressed intermediate its ends, a cradle for each end of said bolster, and an independent spring located within the U-shaped channel of said bolster and interposed between said cradle and said bolster.

In testimony whereof we have hereunto set our hands in the presence of the subscribing witnesses, on this 22nd day of April, A. D. 1913.

FRANK HEDLEY.
JAMES S. DOYLE.

Witnesses:
S. E. DARBY,
G. A. McGRATH.